United States Patent
Day et al.

(10) Patent No.: US 11,377,806 B2
(45) Date of Patent: Jul. 5, 2022

(54) APPARATUS FOR WEED CONTROL

(71) Applicant: Bayer Aktiengesellschaft, Leverkusen (DE)

(72) Inventors: Pascal Day, Lyons (FR); Thomas Arians, Rommerskirchen (DE); Virginie Giraud, Ecully (FR); James Hadlow, Newmarket (GB); Hinnerk Baßfeld, Lienen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 355 days.

(21) Appl. No.: 16/628,846

(22) PCT Filed: Jul. 2, 2018

(86) PCT No.: PCT/EP2018/067780
§ 371 (c)(1),
(2) Date: Jan. 6, 2020

(87) PCT Pub. No.: WO2019/007890
PCT Pub. Date: Jan. 10, 2019

(65) Prior Publication Data
US 2020/0205394 A1  Jul. 2, 2020

(30) Foreign Application Priority Data

Jul. 6, 2017 (EP) .................................... 17180030
Jul. 17, 2017 (EP) .................................... 17181582
(Continued)

(51) Int. Cl.
*G06K 9/00* (2022.01)
*E01H 8/10* (2006.01)
(Continued)

(52) U.S. Cl.
CPC ................. *E01H 8/10* (2013.01); *A01M 7/00* (2013.01); *A01M 7/0089* (2013.01);
(Continued)

(58) Field of Classification Search
CPC . E01H 8/10; E01H 11/00; A01M 7/00; A01M 7/0089; A01M 9/0092;
(Continued)

(56) References Cited

U.S. PATENT DOCUMENTS 5,606,821 A * 3/1997 Sadjadi .............. A01M 7/0089
                                                    47/1.01 R
5,924,239 A * 7/1999 Rees ....................... G01J 3/46
                                                       47/1.7
(Continued)

FOREIGN PATENT DOCUMENTS

CN      100437629 C  * 11/2008
CN      101961003 A     2/2011
(Continued)

OTHER PUBLICATIONS

Burgos-Artizzu, X. et al. (2011). "Real-time image processing for crop/weed discrimination in maize fields," Computers and Electronics in Agriculture, 75:337-346.
(Continued)

*Primary Examiner* — Mahendra R Patel
(74) *Attorney, Agent, or Firm* — Morrison & Foerster LLP

(57) ABSTRACT

An apparatus for weed control includes a processing unit that receives at least one image of an environment. The processing unit analyses the at least one image to determine at least one mode of operation of a vegetation control technology from a plurality of modes of operation of the vegetation control technology to be used for weed control for at least a first part of the environment. An output unit (Continued)

outputs information that is useable to activate the vegetation control technology in the at least one mode of operation.

11 Claims, 11 Drawing Sheets

(30) Foreign Application Priority Data

Aug. 16, 2017 (EP) .................................. 17186467
Aug. 22, 2017 (EP) .................................. 17187259

(51) Int. Cl.

| | | |
|---|---|---|
| *G06T 7/70* | (2017.01) | |
| *A01M 7/00* | (2006.01) | |
| *A01M 9/00* | (2006.01) | |
| *A01M 21/04* | (2006.01) | |
| *G05B 15/02* | (2006.01) | |
| *G06T 7/00* | (2017.01) | |
| *E01H 11/00* | (2006.01) | |
| *G06K 9/62* | (2022.01) | |
| *H04N 5/225* | (2006.01) | |
| *G06V 20/56* | (2022.01) | |
| *G06V 20/10* | (2022.01) | |

(52) U.S. Cl.
CPC ........ *A01M 9/0092* (2013.01); *A01M 21/043* (2013.01); *A01M 21/046* (2013.01); *E01H 11/00* (2013.01); *G05B 15/02* (2013.01); *G06K 9/6267* (2013.01); *G06T 7/0008* (2013.01); *G06T 7/70* (2017.01); *G06V 20/188* (2022.01); *G06V 20/56* (2022.01); *H04N 5/2253* (2013.01); *G06T 2207/30188* (2013.01)

(58) Field of Classification Search
CPC .............. A01M 21/043; A01M 21/046; A01M 7/0014; A01M 7/0042; G05B 15/02; G06K 9/6267; G06T 7/0008; G06T 7/70; G06T 2207/30188; G06V 20/188; G06V 20/56; H04N 5/2253; H04N 7/18; B05B 1/16; B05B 12/122; B05B 13/005; G06Q 50/02
USPC ......................................................... 382/110
See application file for complete search history.

(56) References Cited

U.S. PATENT DOCUMENTS

| | | | | |
|---|---|---|---|---|
| 6,160,902 A | * | 12/2000 | Dickson | G06V 10/143 |
| | | | | 382/110 |
| 6,919,959 B2 | * | 7/2005 | Masten | G01J 3/28 |
| | | | | 356/328 |
| 9,652,840 B1 | * | 5/2017 | Shriver | G01N 33/0098 |
| 2007/0044445 A1 | * | 3/2007 | Spicer | G01B 11/24 |
| | | | | 56/10.1 |
| 2008/0319673 A1 | * | 12/2008 | Welty | G01S 17/89 |
| | | | | 702/5 |
| 2012/0101861 A1 | * | 4/2012 | Lindores | A01B 79/005 |
| | | | | 705/7.11 |
| 2015/0027040 A1 | * | 1/2015 | Redden | A01M 21/046 |
| | | | | 47/1.3 |
| 2017/0024870 A1 | | 1/2017 | Reichhardt | |
| 2017/0066459 A1 | | 3/2017 | Singh | |
| 2017/0228480 A1 | * | 8/2017 | Yoshida | A01G 7/00 |
| 2018/0035606 A1 | * | 2/2018 | Burdoucci | H04N 5/232935 |
| 2018/0153084 A1 | * | 6/2018 | Calleija | A01B 79/005 |
| 2019/0220666 A1 | * | 7/2019 | Kiepe | A01M 99/00 |

FOREIGN PATENT DOCUMENTS

| | | | |
|---|---|---|---|
| CN | 105379460 A | | 3/2016 |
| CN | 205827278 U | * | 12/2016 |
| RU | 2129785 C1 | * | 5/1999 |
| RU | 2129785 C1 | | 5/1999 |
| WO | WO2013072887 A2 | | 5/2013 |
| WO | WO2013072887 A3 | | 5/2013 |
| WO | WO2015013723 A2 | | 1/2015 |
| WO | WO2015013723 A3 | | 1/2015 |
| WO | WO2016191825 A1 | | 12/2016 |
| WO | WO2017077543 A1 | | 5/2017 |

OTHER PUBLICATIONS

Gerhards, R. et al. (2006). "Practical experiences with a system for site-specific weed control in arable crops using real-time image and GPS-controlled patch spraying," Weed Research, 46:3 185-193.

Herrera, P.J. et al. (2014). "A Novel Approach for Weed Type Classification Based on Shape Descriptors and a Fuzzy Decision-Making Method," Sensors, 14:15304-15324.

Subasic, M. (2012). Detection and classification of vegetation along the railroad tracks, located at https://www.fer.unizg.hr/ last visited on Feb. 28, 2020, five pages.

Weedfreeontrack (2010). "WeedFree On Track Spray Train", You Tube, Oct. 28, 2010, Retrieved from the Internet URL: https://www.youtube.com/watch?v=sp3GPaQLOHg.

Weis, M. et al. (2016). "Detection of weeds using image processing and clustering," Bornimer Agrartechnische Berichte 69:138-144.

* cited by examiner ially on Jul. 2, 2018, which claims the benefit of European Application Nos. 17180030.3, filed Jul. 6, 2017; 17181582.2, filed Jul. 17, 2017; 17186467.1, filed Aug. 16, 2017; and 17187259.1, filed Aug. 22, 2017.

APPARATUS FOR WEED CONTROL

CROSS REFERENCE TO RELATED APPLICATIONS

This application is a national stage application under 35 U.S.C. § 371 of International Application No. PCT/EP2018/067780, filed internationally on Jul. 2, 2018, which claims the benefit of European Application Nos. 17180030.3, filed Jul. 6, 2017; 17181582.2, filed Jul. 17, 2017; 17186467.1, filed Aug. 16, 2017; and 17187259.1, filed Aug. 22, 2017.

FIELD OF THE INVENTION

The present invention relates to an apparatus for weed control, to a system for weed control, to a method for weed control, as well as to a computer program element and a computer readable medium.

BACKGROUND OF THE INVENTION

The general background of this invention is weed control. Certain industrial areas and areas around railway tracks need to have the vegetation controlled. For railways, such control improves visibility from the perspective of people on the train such as the driver and improves visibility from the perspective of people working on the tracks. Such control can lead to improved safety. Additionally, vegetation can disrupt or damage tracks and associated signaling and communication lines. Control of the vegetation is then required to mitigate this. Vegetation control, also called weed control, can be very time and resource consuming, especially if carried out manually. A weed sprayer train, with a herbicide contained in chemical tanks on the train can be sprayed onto the track and surrounding area to control the vegetation. However, such weed control can be expensive, and the general public increasingly wishes to see a reduction in environmental impact. It would be advantageous to have improved apparatus for weed control.

SUMMARY OF THE INVENTION

It would be advantageous to have improved apparatus for weed control. It should be noted that the following described aspects and examples of the invention apply also for the apparatus for weed control, the system for weed control, the method for weed control, and for the computer program element and the computer readable medium.

According to some embodiments, provided is an apparatus for weed control, comprising:
 an input unit;
 a processing unit; and
 an output unit.

The input unit is configured to provide the processing unit with at least one image of an environment. The processing unit is configured to analyse the at least one image to determine at least one mode of operation of a vegetation control technology from a plurality of modes of operation of the vegetation control technology to be used for weed control for at least a first part of the environment. The output unit is configured to output information useable to activate the vegetation control technology in the at least one mode of operation.

In other words, an image or images of an environment is acquired. There is a vegetation control technology that can be used for weed control. The vegetation control technology can operate in various modes of operation. The apparatus then analyses the image or images to determine which one or ones of the available modes of operation of the vegetation control technology should be used to control weeds at a specific location or locations of the environment.

According to some embodiments, the most appropriate mode of operation of the vegetation control technology can be used for different areas of the environment. Also, at different areas of the environment, different modes of operation of the vegetation control technology can be used, where each mode of operation of the vegetation technology is the most appropriate for each different area. For example, the mode of operation of a vegetation control technology can take into account the environment, such as it being wet, marshy, dry, sandy and the most appropriate mode of operation selected.

According to some embodiments, there can be a number of different available weed control technologies such as one or more chemicals; chemical spray; chemical liquid; chemical solid; high pressure water; high temperature water; water at high pressure and temperature; steam; electrical power; electrical induction; electrical current flow; High Voltage power; electromagnetic radiation; x-ray radiation; ultraviolet radiation; visible radiation; microwave radiation; pulsed laser radiation; flame system. Each one of these can operate in a number of different modes, for example using more than one chemical or operating at more than one power level or activate for more than one duration in time. Then, for a specific weed control technology, the mode of operation is determined on the basis of image analysis.

According to some embodiments, a high voltage based system where current is passed through a plant and ground to kill it can be applied, then the different modes of operation can comprise different operational power levels that can be applied to kill different plants and/or different durations of application of power. Thus, at different locations in an environment different levels of power of the high voltage system can be applied as required. Different modes of operation can also comprise different durations of a specific level of high voltage level to be applied. Thus, at different locations in an environment different durations of the high voltage system can be applied as required. Different power levels and durations of microwave power, laser radiation power and duration as well as changes in wavelength, for example can constitute different modes of operation of particular weed control technologies.

According to some embodiments, where the weed control technology is a chemical spray based weed control technology, then the different modes of operation can comprise the spraying of different strengths of a particular herbicide and/or the spraying of different types of herbicides having different strengths. Thus, at different locations in an environment different strengths of chemicals can be applied as required. Different modes of operation can also comprise different durations of spraying of a chemical to be applied. Thus, at different locations in an environment different durations of spraying of a particular chemical can be applied as required. In this manner, the environmental impact of herbicides can be reduced because only the herbicide that needs to applied and for a duration that needs to be used is applied.

According to some embodiments, analysis of the at least one image to determine the at least one mode of operation of the vegetation control technology comprises a determination of at least one location of vegetation in the at least first part of the environment. The processing unit is configured then to determine the at least one mode of operation of the vegetation control technology to be used at that at least one location.

In other words, image processing can be used in order to determine the areas of vegetation in the acquired imagery, from which the most appropriate mode of operation of the technology to be used for weed control of that vegetation area can be selected. According to some embodiments, the vegetation control technology can be applied only at the location of vegetation, where the most appropriate mode of operation of the vegetation control technology can be used for each location of vegetation. In this manner, for example, the most appropriate mode of operation of a vegetation control technology can be selected for different vegetation areas, where small areas of vegetation can be controlled via different modes of operation to large areas of vegetation for example.

According to some embodiments, the at least one image was acquired by at least one camera. The input unit is configured then to provide the processing unit with at least one location associated with the at least one camera when the at least one image was acquired.

According to some embodiments, the location can be a geographical location, with respect to a precise location on the ground, or can be a location on the ground that is referenced to a position of the vegetation control technology. In other words, an absolute geographical location can be utilized or a location on the ground that need not be known in absolute terms, but that is referenced to a location of the weed control technology. Thus, by correlating an image with the location where it was acquired, the vegetation control technology can be accurately applied to that location.

According to some embodiments, analysis of the at least one image to determine the at least one mode of operation of the vegetation control technology comprises a determination of at least one type of weed.

In other words, the appropriate mode of operation of the vegetation control technology can be selected to account for the type or types of weeds to be controlled. For example, one type of weed may require only a short duration of application of a weed control technology in order to kill that weed, but a different type of weed may require a longer duration of application of the same weed control technology to kill the weed.

According to some embodiments, the processing unit is configured to determine at least one location of the at least one type of weed. In other words, image processing can be used to determine a type of weed and its location. The location can be the location within the imagery. The location can be an actual geographical location. The location can be within the imagery and be able to be referenced to a position of the vegetation control technology. In this manner, by determining a location of a particular type of weed, the most optimum mode of operation of the vegetation control technology can be applied to that specific location, with this also applying to different weeds at different locations that required different modes of operation of the vegetation control technology to be applied.

According to some embodiments, analysis of the at least one image to determine the at least one mode of operation of the vegetation control technology comprises a determination of a first type of weed in the at least first part of the environment and a determination of a second type of weed in at least a second part of the environment. Thus the most appropriate mode of operation of the vegetation control technology can be determined on the basis of different weed types in an environment.

According to some embodiments, the processing unit is configured to analyse the at least one image to determine a first mode of operation of the vegetation control technology to be used for weed control for the first type of weed in the at least the first part of the environment. The processing unit is also configured to analyse the at least one image to determine a second mode of operation of the vegetation control technology to be used for weed control for the second type of weed in at least a second part of the environment.

In other words, the most appropriate mode of operation of the vegetation control technology can be selected depending upon the specific type of types of weed to be found in parts of an environment, thereby enabling specific modes of operation of the vegetation control technology to be applied only at the locations where those specific weeds are to be found.

According to some embodiments, the processing unit is configured to analyse the at least one image to determine a first mode of operation of the vegetation control technology to be used for weed control for at least the first part of the environment. The processing unit is also configured to analyse the at least one image to determine a second mode of operation of the vegetation control technology to be used for weed control for at least a second part of the environment.

In other words, a first mode of operation of a weed control technology can be selected on the basis of image analysis for weed control at first locations of an environment, and a different mode of operation of the vegetation control technology can be selected for weed control at different locations on the basis of image analysis. In this manner, the most appropriate mode of operation of the vegetation control technology can be selected for certain parts of the environment, with for example one mode of operation of a weed control technology being used for some weeds and a different mode of operation of the vegetation control technology being used for different weeds, and/or one mode of operation of a vegetation control technology can be used for certain types of weeds in a first part of an environment, and a different mode of operation of the vegetation control technology be used for the same weeds in a different part of the environment. For example, the selected vegetation control technology can account for the ground terrain, taking into account for example if the terrain is dry, sandy, marshy, wet, or an area of special environmental importance (protected area) and the most appropriate mode of operation of the vegetation control technology can be selected to account for these terrain types for the same types (or different types) of weeds. Additionally, this means that chemically aggressive weed control means can be kept to a minimum, because if the weed control technology is a chemical spray based for example, the most chemically aggressive spray can be used only when absolutely required. Weeds that can be controlled via less chemically aggressive chemicals means that the environmental impact of chemicals can be kept to an absolute minimum for a weed killing system based on chemical spray technology.

According to some embodiments, provided is a system for weed control, comprising:
  at least one camera;
  an apparatus for weed control according to the first aspect; and
  a vegetation control technology.

According to some embodiments, the at least one camera is configured to acquire the at least one image of the environment. The vegetation control technology is mounted on a vehicle. The vegetation control technology is configured to operate in a plurality of modes of operation. The apparatus for weed control is configured to activate the vegetation control technology in the at least one mode of operation for the at least first part of the environment. For example, a vehicle can move around an environment and control weeds within that environment using different modes of a vegetation control technology, where specific modes of the vegetation control technology are determined on the basis of imagery of that environment. In this way, imagery can be acquired by one platform, for example one or more drones that fly over an environment. That information is sent to an apparatus, that could be in an office. The apparatus determines what modes of the vegetation control technology should be used where, within the environment. This information, can be provided in a weed control map, that is provided to a vehicle that moves around that environment, and at specific parts of the environment activates the required mode of the vegetation control technology.

According to some embodiments, the apparatus for weed control is mounted on the vehicle, and the at least one camera is mounted on the vehicle. In this manner, the system can operate in real time or quasi real time, by acquiring imagery, analysing it to determine what mode of vegetation control technology to use where, and then activating that vegetation control technology in the required mode at the required specific location.

According to some embodiments, the vegetation control technology comprises a plurality of units, and wherein the plurality of units are configured to operate in the plurality of modes of operation. According to some embodiments, there is provided method for weed control, comprising:
(a) providing a processing unit with at least one image of an environment;
(c) analysing by the processing unit the at least one image to determine at least one mode of operation of a vegetation control technology from a plurality of modes of operation of the vegetation control technology to be used for weed control for at least a first part of the environment; and
(e) outputting information by an output unit that is useable to activate the vegetation control technology in the at least one mode of operation.

According to some embodiments, step c) comprises step determining at least one location of vegetation in the at least first part of the environment; and wherein the method comprises step d) determining by the processing unit the at least one mode of operation of the vegetation control technology to be used at that at least one location.

According to some embodiments, in step a) the at least one image was acquired by at least one camera; and wherein the method comprises step b) providing the processing unit with at least one location associated with the at least one camera when the at least one image was acquired. According to some embodiments, there is provided a computer program element for controlling an apparatus according to the apparatus of the first aspect and/or system according to the second aspect, which when executed by a processor is configured to carry out the method of the third aspect. Advantageously, the benefits provided by any of the above aspects equally apply to all of the other aspects and vice versa.

BRIEF DESCRIPTION OF THE DRAWINGS

Exemplary embodiments will be described in the following with reference to the following drawings.

DETAILED DESCRIPTION OF EMBODIMENTS

Figure 1:
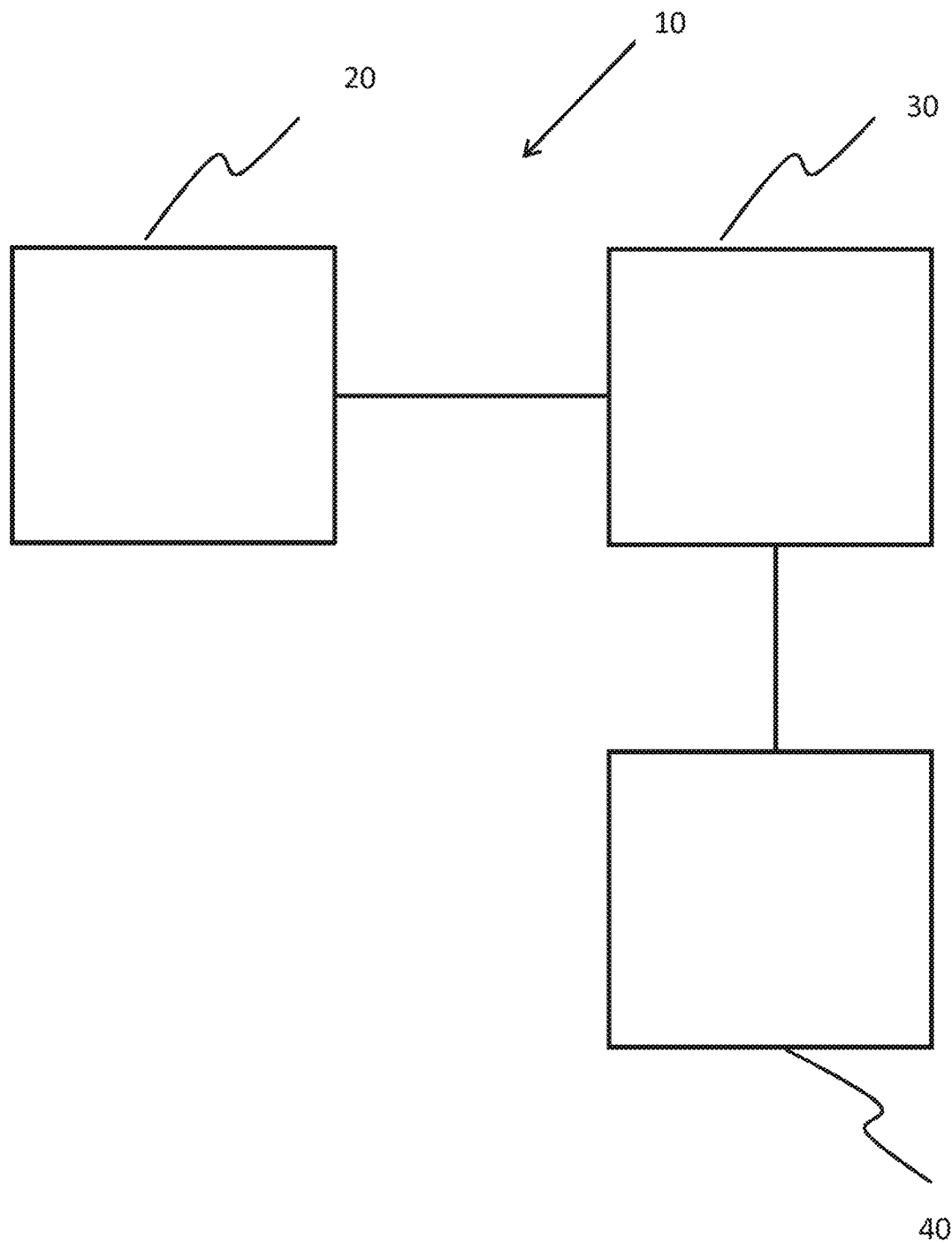
FIG. 1 shows an exemplary schematic of an apparatus for weed control according to some embodiments.

FIG. 1 shows an example of an apparatus 10 for weed control according to some embodiments. The apparatus 10 comprises an input unit 20, a processing unit 30, and an output unit 40. The input unit 20 is configured to provide the processing unit 30 with at least one image of an environment. This can be via wired or wireless communication. The processing unit 30 is configured to analyse the at least one image to determine at least one mode of operation of a vegetation control technology from a plurality of modes of operation of the vegetation control technology to be used for weed control for at least a first part of the environment. The output unit 40 is configured to output information useable to activate the vegetation control technology in the at least one mode of operation.

According to some embodiments, the apparatus is operating in real-time, where images are acquired and immediately processed and the determined mode of operation of the vegetation control technology is immediately used to control weeds. Thus, for example a vehicle can acquire imagery of its environment and process that imagery to determine which mode of operation of the vegetation control technology carried by the vehicle should be used for particular parts of its environment.

According to some embodiments, the apparatus is operating in quasi real time, where images are acquired of an environment and immediately processed to determine which mode of operation of the vegetation control technology should be used to control weeds at particular areas of that environment. That information can later be used by an appropriate system (or systems) that travel(s) within the environment and applies the appropriate mode of operation the vegetation control technology to particular parts of that environment. Thus for example, a first vehicle, such as a car, train, lorry or unmanned aerial vehicle (UAV) or drone equipped with one or more cameras can travel within an environment and acquire imagery. This imagery can be immediately processed to determine a "weed map", detailing where within the environment specific modes of operation of the vegetation control technology should be used. Later, a vehicle equipped with the vegetation control technology that can operate in a number of different modes of operation can travel within the environment and apply the specific determined modes of operation of the weed control technology to different specific areas of the environment. In another example, a number of different vehicles each equipped with a vegetation control technology that operates in a single mode of operation, but with the modes of operation across those vehicles being different, travel within the environment and use their specific mode of operation of the vegetation control technology only to those specific areas of the environment, where it has been determined that that mode of operation of the vegetation control technology should be used.

According to some embodiments, the apparatus is operating in an offline mode. Thus, imagery that has previously been acquired is provided later to the apparatus. The apparatus then determines where specific mode of operation of the vegetation control technology should be used within an area, and in effect generates a weed map. The weed map is then used later by one or more vehicles that then travel within the area and apply specific modes of operation of the vegetation control technology to specific parts of the environment.

According to some embodiments, the output unit outputs a signal that is directly useable to activate the mode of operation of the vegetation control technology. According to some embodiments, analysis of the at least one image to determine the at least one mode of operation of the vegetation control technology comprises a determination of at least one location of vegetation in the at least first part of the environment, and wherein the processing unit is configured to determine the at least one mode of operation of the vegetation control technology to be used at that at least one location. According to some embodiments, the at least one image was acquired by at least one camera, and wherein the input unit is configured to provide the processing unit with at least one location associated with the at least one camera when the at least one image was acquired.

According to some embodiments, the location is an absolute geographical location. According to some embodiments, the location is a location that is determined with reference to the position of the vegetation control technology. In other words, an image can be determined to be associated with a specific location on the ground, without knowing its precise geographical position, but by knowing the position of the vegetation control technology with respect to that location at the time the image was acquired, the required mode of operation of that vegetation control technology can then be applied at a later time at that location by moving the vegetation control technology to that location.

According to some embodiments, a GPS unit is used to determine, and/or is used in determining, the location of the at least one camera when specific images were acquired. According to some embodiments, an inertial navigation unit is used alone, or in combination with a GPS unit, to determine the location of the at least one camera when specific images were acquired. Thus for example, the inertial navigation unit, comprising for example one or more laser gyroscopes, is calibrated or zeroed at a known location and as it moves with the at least one camera the movement away from that known location in x, y, and z coordinates can be determined, from which the location of the at least one camera when images were acquired can be determined.

According to some embodiments, image processing of acquired imagery is used alone, or in combination with a GPS unit, or in combination with a GPS unit and inertial navigation unit, to determine the location of the at least one camera when specific images were acquired. Thus visual markers can be used alone, or in combination with GPS derived information and/or inertial navigation derived information to determine the location of the camera. According to some embodiments, analysis of the at least one image to determine the at least one mode of operation of the vegetation control technology comprises a determination of at least one type of weed. According to some embodiments, the processing unit is configured to determine at least one location of the at least one type of weed.

According to some embodiments, analysis of the at least one image to determine the at least one mode of operation of the vegetation control technology comprises a determination of a first type of weed in the at least first part of the environment and a determination of a second type of weed in at least a second part of the environment. According to some embodiments, the processing unit is configured to analyse the at least one image to determine a first mode of operation of the vegetation control technology to be used for weed control for the first type of weed in the at least the first part of the environment. The processing unit is configured also to analyse the at least one image to determine a second mode of operation of the vegetation control technology to be used for weed control for the second type of weed in at least a second part of the environment.

According to some embodiments, the processing unit is configured to analyse the at least one image to determine a first mode of operation of the vegetation control technology to be used for weed control for at least the first part of the environment. The processing unit is configured also to analyse the at least one image to determine a second mode of operation of the vegetation control technology to be used for weed control for at least a second part of the environment. According to some embodiments, the at least second part of the environment is different to the at least first part of the environment.

Thus, different weeds can be determined in different parts of an environment to enable the most appropriate mode of operation of the vegetation control technology to be determined for those areas. According to some embodiments, the at least second part of the environment is at least partially bounded by the at least first part of the environment. In other words, an area of an environment is found within another area of an environment. One mode of operation a vegetation control technology can then be used for a large area, and for a smaller area to be found within that area another mode of operation of the vegetation control technology can be used. According to some embodiments, the at least second part of the environment is at least one subset of the at least first part of the environment.

According to some embodiments, a smaller area of for example a specific type of weed can be found within a larger area of a weed. For example, one or more dandelions can be located within a region of grass. Then, a first mode of a vegetation control technology can be used across the whole grass area, including where the dandelions are to be located. This mode of vegetation control technology can be selected as that appropriate to control grass, and need not be the most aggressive vegetation control technology available. For example, a relatively low power high voltage technique could be applied to this area, or a relatively weak chemical spray applied over the whole area. However, for the subset of that grass area, where harder to kill weeds such as dandelions are to be found, then a more aggressive mode of the vegetation control technology can be used, such as a higher power mode of the high voltage technique can be applied or a more aggressive chemical sprayed at that specific location. In this way, the amount of power required can be minimized, the environmental impact can be minimized, and when the vegetation control technology is a chemical spray based technology the amount of aggressive chemicals used can be minimised.

According to some embodiments, analysis of the at least one image comprises utilisation of a machine learning algorithm. According to some embodiments, the machine learning algorithm comprises a decision tree algorithm. According to some embodiments, the machine learning algorithm comprises an artificial neural network. According to some embodiments, the machine learning algorithm has been taught on the basis of a plurality of images. According to some embodiments, the machine learning algorithm has been taught on the basis of a plurality of images containing imagery of at least one type of weed. In an example, the machine learning algorithm has been taught on the basis of a plurality of images containing imagery of a plurality of weeds.

According to some embodiments, available vegetation control technologies comprises the following: one or more chemicals; chemical spray; chemical liquid; chemical solid; high pressure water; high temperature water; water at high pressure and temperature; steam; electrical power; electrical induction; electrical current flow; High Voltage power; electromagnetic radiation; x-ray radiation; ultraviolet radiation; visible radiation; microwave radiation; pulsed laser radiation; flame system. In other words, the mode of operation of the vegetation control technology relates to determining the mode of operation of one of these vegetation control technology on the basis of analysed imagery of an environment.

Figure 2:
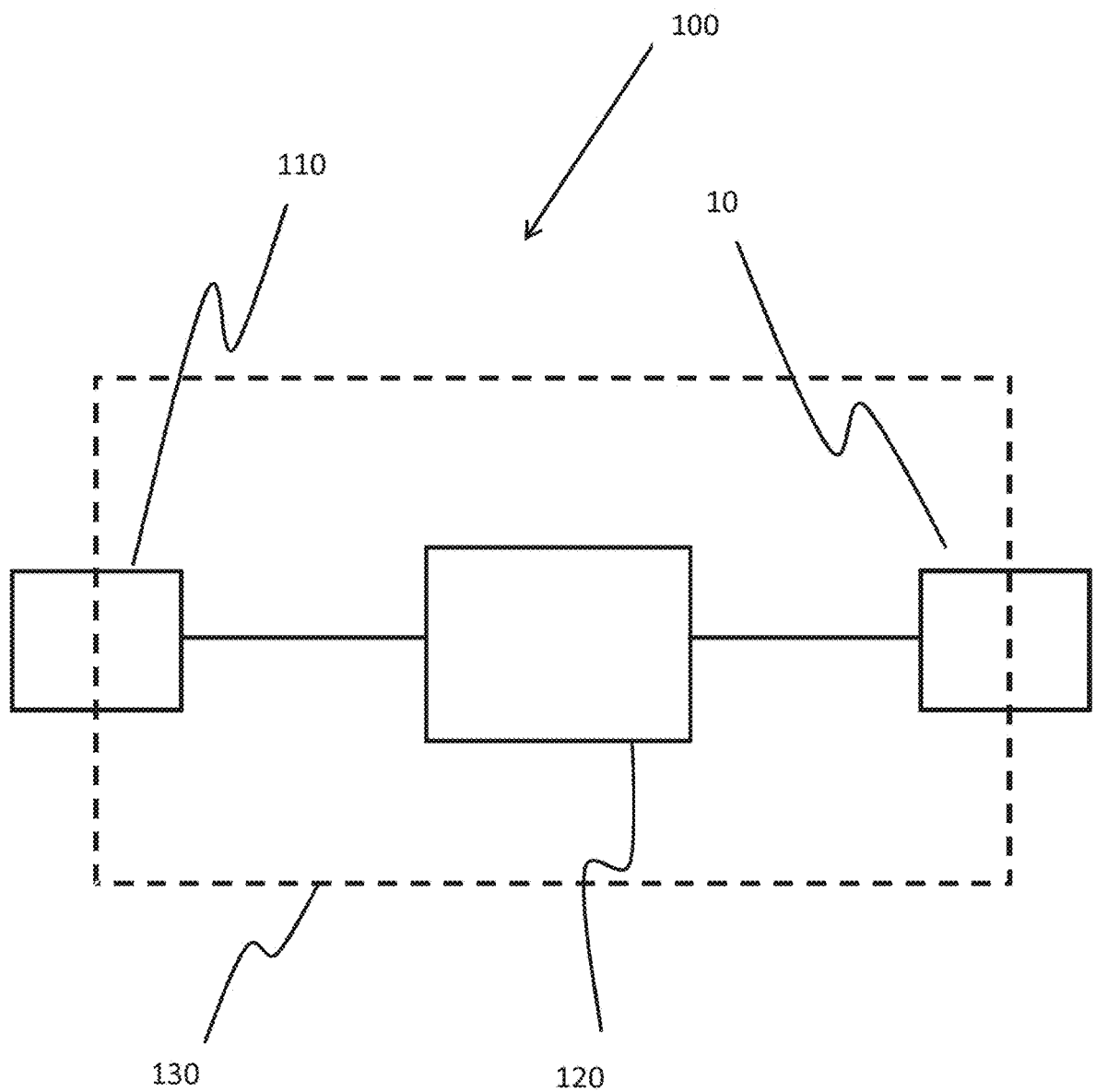
FIG. 2 shows an exemplary schematic of a system for weed control according to some embodiments.

FIG. 2 shows an example of a system 100 for weed control. The system 100 comprises at least one camera 110, and an apparatus 10 for weed control as described above for any of the examples associated with FIG. 1. The system 100 also comprises a vegetation control technology 120. The at least one camera 110 is configured to acquire the at least one image of the environment. The vegetation control technology 120 is mounted on a vehicle 130. The vegetation control technology 120 is configured to operate in a plurality of modes of operation. The apparatus 10 for weed control is configured to activate the vegetation control technology 120 in the at least one mode of operation for the at least first part of the environment.

According to some embodiments, the apparatus 10 is mounted on the vehicle 130. According to some embodiments, the at least one camera 110 is mounted on the vehicle 130. According to some embodiments, the vehicle is a train, or train wagon. According to some embodiments, the vehicle is a lorry or truck or Unimog.

According to some embodiments, the input unit is configured to provide the processing unit with at least one location associated with the at least one camera when the at least one image was acquired. According to some embodiments, the location is a geographical location.

According to some embodiments, the apparatus is configured to activate the vegetation control technology in the at least one mode of operation on the basis of the at least one geographical location associated with the at least one camera when the at least one image was acquired and a spatial relationship between the at least one camera and the vegetation control technology. In this manner, by knowing where the image has been acquired by a camera mounted on a vehicle and also knowing where a vegetation control technology is mounted on the vehicle with respect to the camera, it is simple to take into account the forward speed of the vehicle in order to activate that vegetation control technology at the same location where the image was acquired, and indeed within that imaged area.

According to some embodiments, the apparatus is configured to activate a first mode of a vegetation control technology before activation of a second mode of the vegetation control technology, or activate the first mode of the vegetation control technology after activation of the second mode of the vegetation control technology. According to some embodiments, the vegetation control technology comprises a plurality of units, and wherein the plurality of units are configured to operate in the plurality of modes of operation.

According to some embodiments, each unit is configured to operate in a different mode of operation of the vegetation control technology. In an example, the plurality of units are mounted one in front of the other with respect to a direction of travel of the vehicle. In this way, a specific of operation of the vegetation control technology of a unit can have a variable duration through one unit operating for a variable length of time. However, the maximum duration of application by one unit is dependent upon the size of the applicator, which can have sub-units that can be activated, and the speed of the vehicle. However, one unit can operate for a maximum time at a specific location of the ground dependent upon its size and speed of the vehicle. This time of application, at that specific location, can be increased through the unit that is situated behind that unit also applying vegetation control technology at that location as that unit moves forward with the vehicle. Thus, a plurality of modes of operation of a vegetation control technology can relate to the vegetation control technology having different durations of application of the vegetation control technology, and the processing unit determines the duration of the vegetation control technology to be applied at a location. This duration can be varied within a unit itself, and further increased by a number of units that move over a specific location applying the vegetation control technology at that location. Also, by having a plurality of units mounted in front of each other, each unit can operate in a different mode of operation, for example apply different power levels of a high voltage weed control technology. Then as the units move forward with the vehicle, the required high voltage power can be applied at a specific location. A unit itself can have variable high voltage power capability, thereby saving space but required a more complex weed control technology within that unit.

According to some embodiments, a unit that is configured to operate in a first mode of the vegetation control technology is mounted in front of a unit configured to operate in a second mode of the vegetation control technology with respect to a direction of travel of the vehicle, or the unit configured to operate in a first mode of operation of the vegetation control technology is mounted behind the unit configured to operate in a second mode of operation of the vegetation control technology with respect to the direction of travel of the vehicle.

Figure 3:
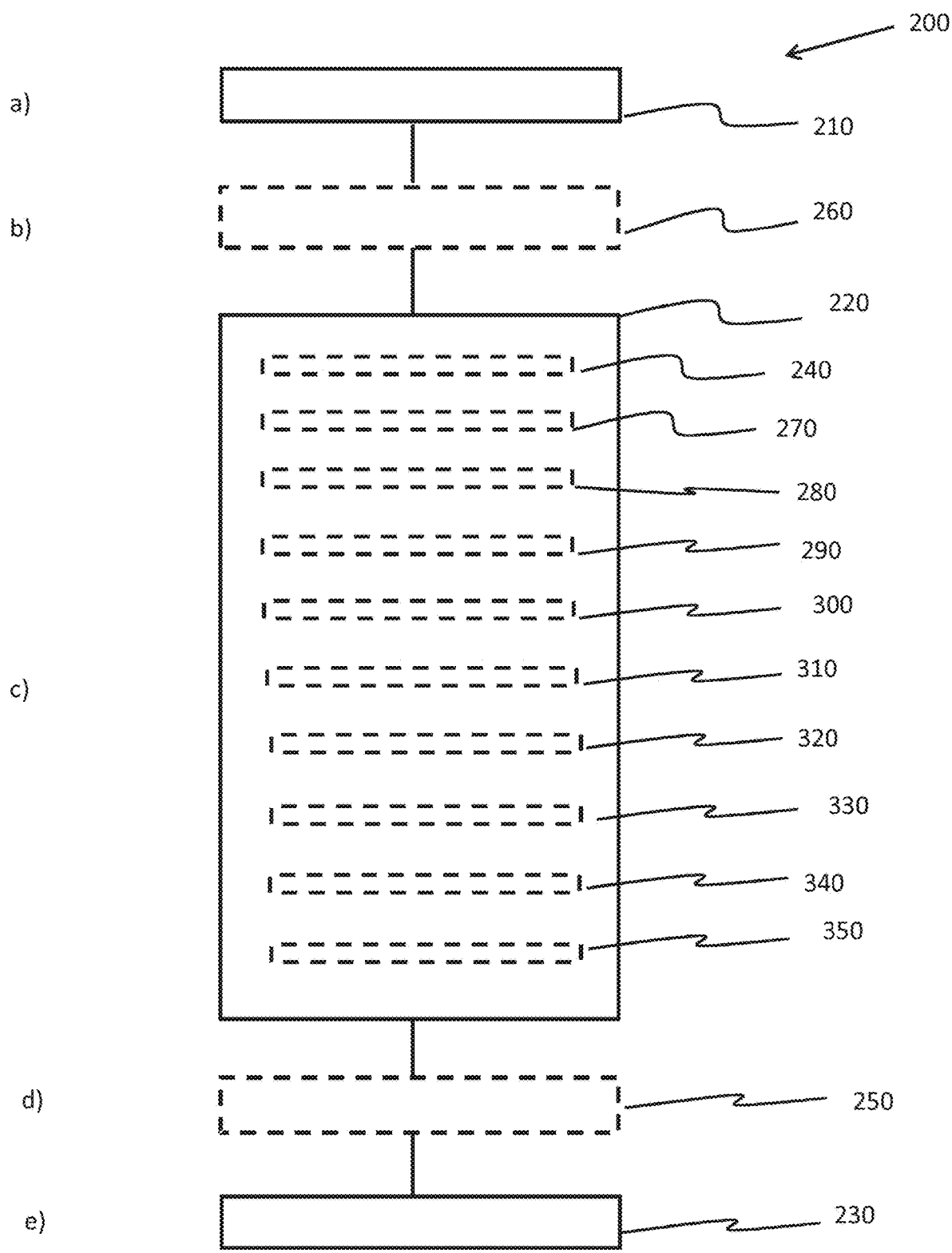
FIG. 3 shows a flow diagram describing a method for weed control according to some embodiments.

FIG. 3 shows a flow diagram describing method 200 for weed control according to some embodiments. The method 200 comprises:

in a providing step 210, also referred to as step (a), providing a processing unit 30 with at least one image of an environment; in an analyzing step 220, also referred to as step (c), analysing by the processing unit the at least one image to determine at least one mode of operation of a vegetation control technology from a plurality of modes of operation of the vegetation control technology to be used for weed control for at least a first part of the environment; and in an outputting step 230, also referred to as step (e), outputting information by an output unit 40 that is useable to activate the vegetation control technology in the at least one mode of operation.

According to some embodiments, the at least one image of the environment is provided from an input unit 20 to the processing unit. According to some embodiments, step c) comprises the step of determining 240 at least one location of vegetation in the at least first part of the environment. The method then comprises step d) determining 250 by the processing unit the at least one mode of vegetation control technology to be used at that at least one location.

According to some embodiments, in step a) the at least one image was acquired by at least one camera, and the method comprises step b) providing 260 the processing unit with at least one location associated with the at least one camera when the at least one image was acquired.

According to some embodiments, step c) comprises determining 270 at least one type of weed. According to some embodiments, step c) comprises determining 280 at least one location of the at least one type of weed. According to some embodiments, step c) comprises determining 290 a first type of weed in the at least first part of the environment and determining 300 a second type of weed in at least a second part of the environment. According to some embodiments, step c) comprises determining 310 a first mode of the vegetation control technology to be used for weed control for the first type of weed in the at least the first part of the environment, and determining 320 a second mode of the vegetation control technology to be used for weed control for the second type of weed in at least a second part of the environment. According to some embodiments, step c) comprises determining 330 a first mode of vegetation control technology to be used for weed control for at least the first part of the environment; and determining 340 a second mode of operation of the vegetation control technology to be used for weed control for at least a second part of the environment.

According to some embodiments, the at least second part of the environment is different to the at least first part of the environment. According to some embodiments, the at least second part of the environment is at least partially bounded by the at least first part of the environment. According to some embodiments, the at least second part of the environment is at least one subset of the at least first part of the environment. According to some embodiments, step c) comprises utilising 350 a machine learning algorithm. According to some embodiments, the method comprises using a vehicle, and wherein the method comprises acquiring by at least one camera the at least one image of the environment; and activating the vegetation control technology in the at least one mode of operation, that is mounted on the vehicle, for the at least first part of the environment.

According to some embodiments, the method comprises mounting the processing unit, the output unit, and the at least one camera on the vehicle.

According to some embodiments, the method comprises activating a first mode of the vegetation control technology before activating a second mode of the vegetation control technology, or activating the first mode of the vegetation control technology after activating the second mode of the vegetation control technology.

The apparatus, system and method for weed control are now described in more detail in conjunction with FIGS. 4-11, which relate to weed control in the environment of a railway track, with the vegetation control technology (also called weed control technology) being mounted on part(s) of the train according to some embodiments. As described above, the weed control technology can be one of any number of different weed control technologies, which can operate in more than one mode of operation.

Figure 4:
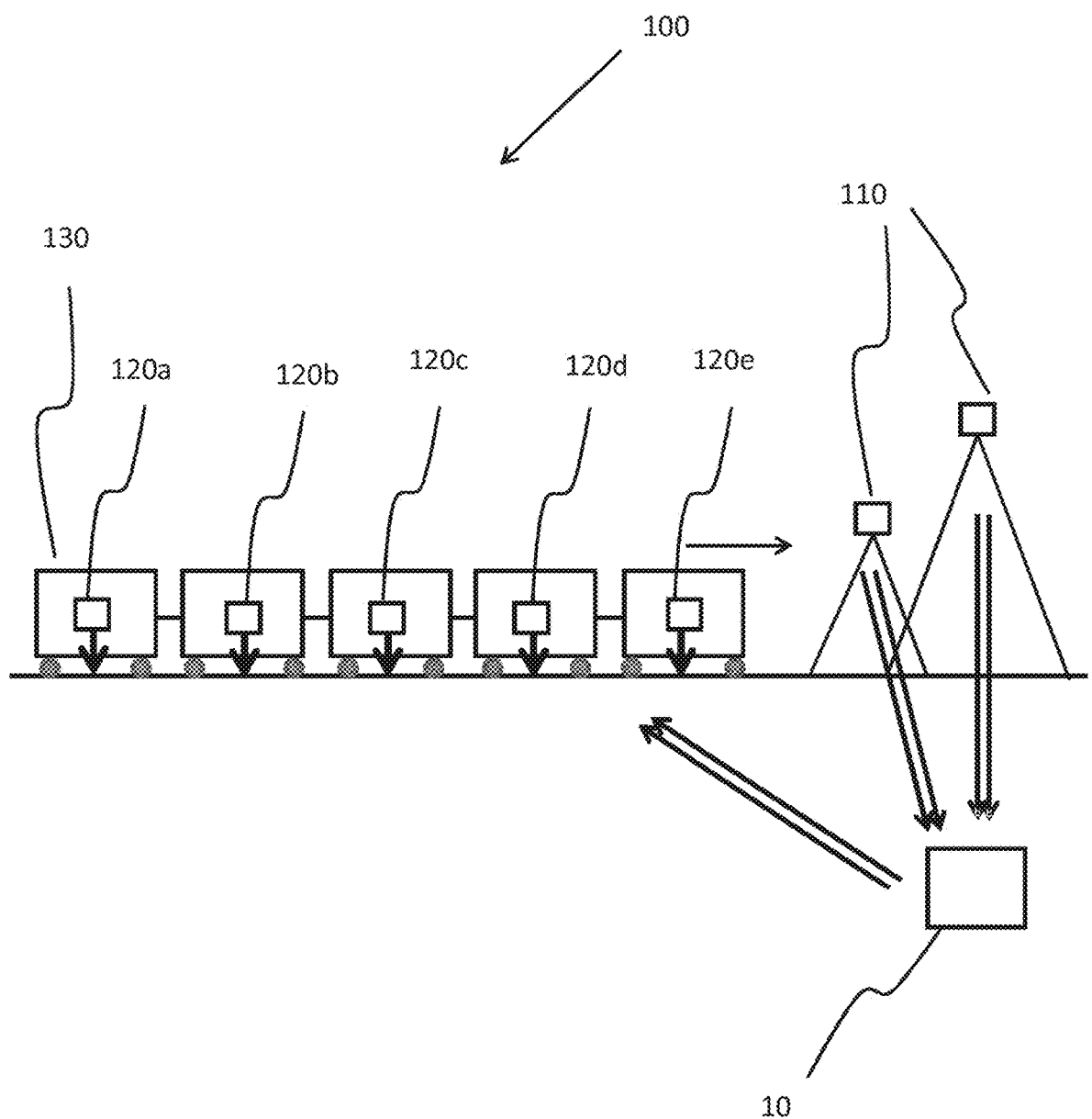
FIG. 4 shows an exemplary schematic of a system for weed control according to some embodiments.

FIG. 4 shows an example of a system 100 for weed control according to some embodiments. Several drones have cameras 110. The drones fly along a railway track. The cameras acquire imagery of the environment of the railway track, with this being the ground between the track and the ground to the sides of the track. The environment being imaged is that that is required to have weeds controlled. There need not be several drones, and one drone with one camera 110 can acquire the necessary imagery. Indeed, the imagery could have been acquired by a camera 110 or cameras 110 that were hand held by personnel visiting the railway track environment, by a plane, satellite or by a train that has run along the railway track for example. The imagery acquired by the cameras 110 is at a resolution that enables vegetation to be identified as vegetation and indeed can be at resolution that enables one type of weed to be differentiated from another type of weed. The acquired imagery can be colour imagery but need not be. The imagery acquired by the drones is transmitted to an apparatus 10. The imagery can be transmitted to the apparatus 10 as soon as it has been acquired by the cameras 110, or can be transmitted at a later time than when it was acquired, for example when the drones have landed. The drones can have Global Positioning Systems (GPS) and this enables the location of acquired imagery to be determined. For example the orientation of cameras 110 and the position of the drone when imagery was acquired can be used to determine the geographical footprint of the image at the ground plane. The drones can also have inertial navigation systems, based for example on laser gyroscopes. In addition to being used to determine the orientation of the drone and hence of the camera, facilitating a determination of when on the ground the imagery has been acquired, the inertial navigation systems can function alone without a GPS system to determine the position of the drone, by determining movement away from a known or a number of known locations.

According to some embodiments, an input unit 20 of the apparatus 10 passes the acquired imagery to a processing unit 30. Image analysis software operates on the processor 30. The image analysis software can use feature extraction, such as edge detection, and object detection analysis that for example can identify structures such as railway tracks, sleepers, trees, level crossings, station platforms. Thus, on the basis of known locations of objects, such as the locations of buildings within the environment, and on the basis of known structure information such as the distance between sleepers and the distance between the railway tracks, the processing unit can patch the acquired imagery to in effect create a synthetic representation of the environment that can in effect be overlaid over a geographical map of the environment. Thus, the geographical location of each image can be determined, and there need not be associated GPS and/or inertial navigation based information associated with acquired imagery. However, if there is GPS and/or inertial navigation information available then such image analysis, that can place specific images at specific geographical locations only on the basis of the imagery, is not required. Although, if GPS and/or inertial navigation based information is available then such image analysis can be used to augment the geographical location associated with an image.

Thus for example, if on the basis of GPS and/or inertial navigation based information the centre of an acquired image is deemed to be located 22 cm from the side edge and 67 cm from the end of a particular railway sleeper of a section of railway, whilst from the actual acquired imagery, through the use of the above described image analysis, the centre of the image is determined to be located 25 cm from the edge and 64 cm from the end of the sleeper, then the GPS/inertial navigation based derived location can be augmented by shifting the location 3 cm in one direction and 3 cm in another direction as required.

According to some embodiments, the processor 30 runs further image processing software. This software analyses an image to determine the areas within the image where vegetation is to be found. Vegetation can be detected based on the shape of features within acquired images, where for example edge detection software is used to delineate the outer perimeter of objects and the outer perimeter of features within the outer perimeter of the object itself. A database of vegetation imagery can be used in helping determine if a feature in imagery relates to vegetation or not, using for example a trained machine learning algorithm such as an artificial neural network or decision tree analysis. The camera can acquire multi-spectral imagery, with imagery having information relating to the colour within images, and this can be used alone, or in combination with feature detection to determine where in an image vegetation is to be found. As discussed above, because the geographical location of an image can be determined, from knowledge of the size of an image on the ground, the location or locations of vegetation to be found in an image can then be mapped to the exact position of that vegetation on the ground.

According to some embodiments, the processor 30 then runs further image processing software that can be part of the image processing that determines vegetation location on the basis of feature extraction, if that is used. This software comprises a machine learning analyser. Images of specific weeds are acquired, with information also relating to the size of weeds being used. Information relating to a geographical location in the world, where such a weed is to be found and information relating to a time of year when that weed is to be found, including when in flower etc. can be tagged with the imagery. The names of the weeds can also be tagged with the imagery of the weeds. The machine learning analyser, which can be based on an artificial neural network or a decision tree analyser, is then trained on this ground truth acquired imagery. In this way, when a new image of vegetation is presented to the analyser, where such an image can have an associated time stamp such as time of year and a geographical location such as Germany or South Africa tagged to it, the analyser determines the specific type of weed that is in the image through a comparison of imagery of a weed found in the new image with imagery of different weeds it has been trained on, where the size of weeds, and where and when they grow can also be taken into account. The specific location of that weed type on the ground within the environment, and its size, can therefore be determined.

According to some embodiments, the processor 30 has access to a database containing different weed types, and the optimum mode of a weed control technology to be used in controlling that weed type, which has been compiled from experimentally determined data. For example, the specific type of chemical to be sprayed on a weed from a number of available chemicals, the duration of high voltage (or laser radiation, or microwave radiation, or water jet or steam jet or flame jet) to be applied at a specific location for a specific type of weed, and/or the power level of high voltage (or laser radiation or microwave radiation etc.). The size of the weed or clump of weeds on the ground can also be taken into account in determining which mode of weed control technology (also called vegetation control technology) to be used. For example, a specific type of chemical to be used in a chemical spray may be the most optimum weed control technology for a particular type of weed. The processor can then determine that for a single weed or a small clump of this weed at a particular location in the environment the chemical spray weed control technology should be activated at that specific location to control the weeds with a specific chemical. However, if there is a large clump of this specific type of weed that has been identified and located in the environment, the processor can determine that to mitigate the impact of the chemical on the environment a different mode of that weed control technology such as a weaker chemical to be sprayed over that area should be used. The same applies to different modes of flame based weed control, or high voltage based weed control, or a steam or high pressure water based weed control technology, or a microwave based weed control technology, where the mode of operation of these specific weed control technologies can be matched to specific locations, where for example different types of weeds or different soil types are to be found. The processor ensures that all weeds that need to be controlled, have assigned to them at least one mode of the weed control technology to be used. It could be the case that to best control a specific type of weed, two different modes of a weed control technology, for example an increased duration of microwave radiation in combination with an increased power level of the microwave radiation. The same applies to high voltage, laser radiation etc. The processor then creates an appropriate weed control map, detailing what mode or modes of a weed control technology should be applied where.

Thus, the cameras 110 of the drones acquire imagery of an environment that is passed to a processor 30 that determines what modes of a weed control technology should be applied at which specific geographical locations in the environment. Thus, in effect a weed map or a weed control technology mode map can be generated that indicates where within the environment specific modes of a weed control technology should be used.

With continued reference to FIG. 4, a weed control train 130 progresses along the railway track. According to some embodiments, the weed control train has a number of trucks, each housing a weed control technology that can operate in different modes. According to some embodiments, a first truck has a chemical spray based weed control technology 120a that sprays chemical "a". A second truck has a chemical spray based weed control technology 120b that sprays chemical "b", trucks 120c, 120d, and 120e spray chemicals "c", "d" and "e" respectively. A different train or the same train that has different trucks coupled to it, can house a different weed control technology such as high voltage based, laser based, microwave based, steam based, and other weed control technologies are available such as flame based, solid (foam) chemical deposition, and even mechanical based weed control technologies. Taking for example, a high voltage based weed control technology, then each of the trucks can have a high voltage system that operates at different power levels, and some trucks can operate at the same power level. Thus, trucks with units 120a, 120b and 120c can operate at a high voltage power level of "AA". The truck with unit 120d can operate at a high voltage power level "10×AA", and the truck with unit 120e can operate at a high voltage power level of "100×AA". There can be more than one truck that operates at a power level of "10AA" and more than one truck that operates at a power level of "100AA". The weed control train has a processor (not shown) which uses the above discussed weed map or weed control map. The weed control train has means to determine its geographical location, which can be based on one or more of GPS, inertial navigation, image analysis in order to locate the position of the weed control train and the specific locations of the units of the weed control technology. This means that when the weed control train passes through the environment the different units of the weed control technology can be activated at the specific locations of weeds, where the specific mode of the weed control technology activated at the location of the weed has been determined to be optimal for that task. As discussed above, according to some embodiments, the weed control train can have a camera and acquire imagery. Acquired imagery can be processed by the processor on the weed control train to determine the location of the train itself, through determining the location of sleepers and features in the surroundings. Also, when the weed control train has a GPS and/or an inertial system, the GPS and/or inertial navigation systems can be used to determine the location of the train in order that the correct mode of the weed control technology can be activated at the location of specific weeds. However, if the train also has a camera acquiring imagery of the surrounding, feature extraction such as the position of sleepers etc. can be used to augment the position determined by GPS and/or inertial navigation to make corrections in position in order that the weed control technology can activate at the exact locations of weeds, to take into account for example a position derived from the GPS system. Thus, the image processing required to determine the positions of sleepers can run quickly, with location updates being applied rapidly, because the complexity of image processing in locating features such as railway sleepers is not relatively large. Taking the example, of the high voltage weed control technology then a database of duration of high voltage to be applied and at what power level that kills weeds is used by the processor to determine the specific mode of the high voltage system to be applied at specific locations in the environment. Similar databases, are used for chemicals that can be sprayed, and for microwave power levels and durations etc. that are required to kill specific weeds.

Figure 5:
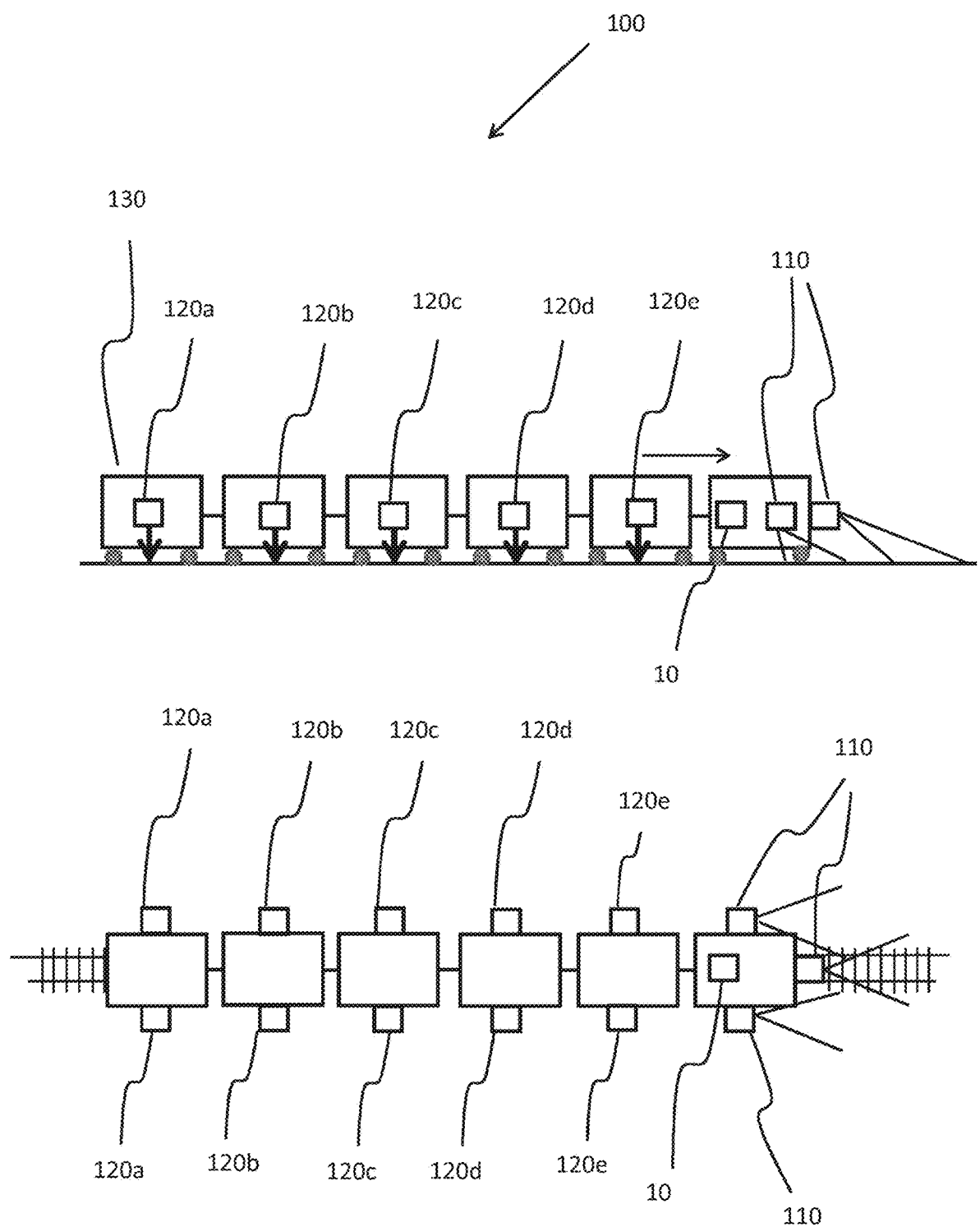
FIG. 5 shows exemplary top view and side view schematics of a system for weed control according to some embodiments.

FIG. 5 shows another example of a system 100 for weed control according to some embodiments. The system for weed control of FIG. 5 is similar to that shown in FIG. 4. However, in FIG. 5 the weed control train 130 has cameras 110 and an apparatus 10 as previously discussed. The cameras 110 on the weed control train 130 now acquire that imagery that was previously acquired by the drones. The processor 30 of the apparatus on the weed control train 130 processes the acquired imagery to determine the location and type of weed. The exact geographical location of the weed is not then required to be determined. Rather, on the basis of a relative spacing between the cameras 110 and the units housed in trucks of the train that have a weed control technology 120a-e that can operate in different modes, an acquired image can be located at a specific point on the ground and weeds located and identified within that image and accordingly located on the ground, with the required modes of weed control technology 120a-e to be activated at the location of the weed being determined. Then, from knowledge of the forward motion of the weed control train (its speed) and the time when an image was acquired, it can be determined when the required mode of weed control technology should be activated such that it activates at the position of the weed. In this way, the weed control train does not need to have a GPS and/or inertial navigation system or image based absolute geographical location determination means. Rather, to account for the processing required to determine the type of weed and its exact location within an image and its exact location on the ground—within a train coordinate system—the cameras 110 may be spaced from the weed control technologies 120 by a distance that is at least equal to the processing time multiplied by the maximum velocity of the weed control train during weed control. Thus for example, if processing takes 0.2 s, 0.4 s, or 0.8 s for a train travelling at 25 m/s, with reference to FIG. 5 the cameras 110 may be spaced forward of weed control technology 120e by 5 m, 10 m or 20 m for this train velocity. A reduction in train velocity enables the separation to be reduced. In addition, the cameras 110 that are acquiring the imagery can have very short exposure times in order that image smear due to movement of the train during the exposure time is minimized. This can be by various means, including the use of cameras with short exposure times or short pulsed illumination via for example lasers or LEDs in combination with filters for example. However, the apparatus can use a GPS system and/or inertial navigation system and/or image analysis to determine an exact geographical location of weeds. This means that a log of what weeds have been controlled by what mode of the weed control technology and what weed control technology was used, and where those weeds were located can be determined.

According to some embodiments, by generating an exact geographical location of the weeds, the modes of the weed control technologies 120a-120e can have associated location determining means, such as a GPS system and/or inertial navigation system and/or image based system that can be used to provide the exact position of the specific weed control technology. Thus, a front carriage of a train can have the image acquisition and analysis units that enable a weed control map to be constructed. The last few trucks of a train could then have the weed control technology housed within them that can operate in the different modes. These latter trucks could be spaced from the front carriage by many tens if not hundreds of metres by load carrying trucks. The absolute separation of the front carriage to the rear carriages could then vary as the train goes up and down hill, but because the trucks with the weed control technologies know their exact locations, when they have moved forwards to the position of a weed or areas of weeds of a particular type, the appropriate mode of weed control technology can be activated at that precise geographical location.

FIG. 5 shows two views of the weed control train 130, the top being a side view and the bottom showing a plan view according to some embodiments. This shows the cameras 110 acquiring imagery that extends between the tracks and to the sides of the tracks. The individual trucks of the weed control train have the associated mode of the weed control technology that can be applied beneath the train and to the side of the train.

Figure 6:
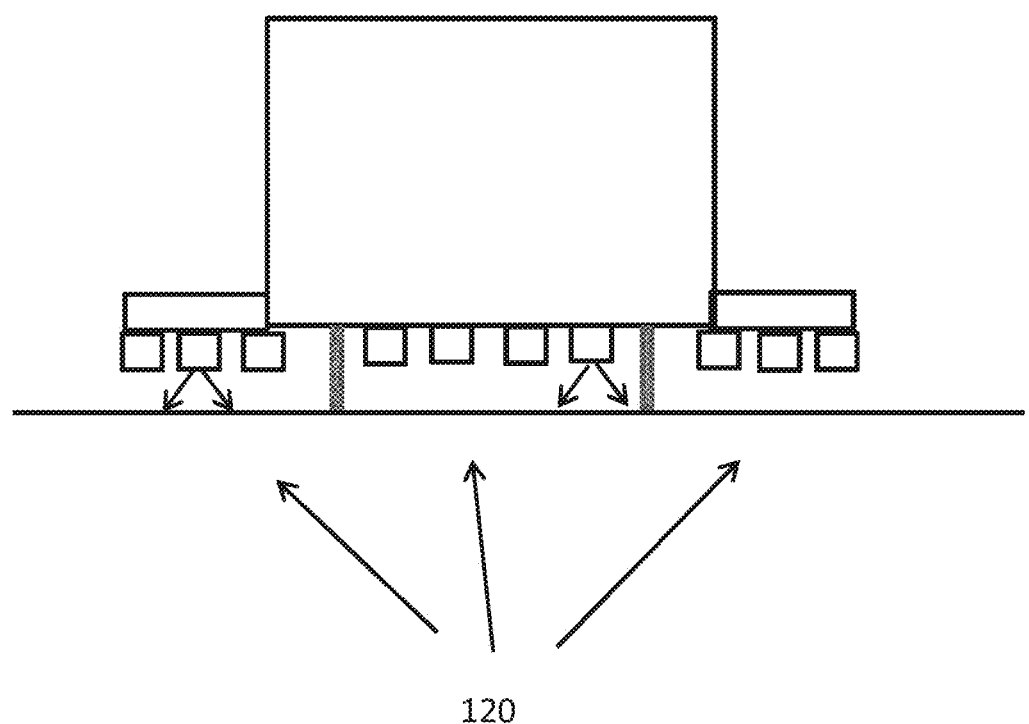
FIG. 6 shows an exemplary rear view schematic of a part of a system for weed control according to some embodiments.

FIG. 6 shows a truck of a weed control train 130 similar to that as shown in FIGS. 4-5, that has a chemical spray based weed control technology 120a-e according to some embodiments. FIG. 6 shows a rear view of one truck of the train, with the view being that down the railway track. The different modes of the spray based weed control technology 120a, 120b, 120c, 120d, and 120e all relate to different chemicals that can be sprayed. Thus different strengths of a particular chemical can be used, or different chemicals can be used that target specific types of vegetation types. A number of separate spray nozzles of the weed control technology 120a extend laterally beneath the train and to the sides of the train. The spray nozzles can also extend in a forward direction. A spray nozzle can itself have specific control, outside of being on or off, and can be directionally controlled to spray to the left and of right or downwards, and/or to be controlled such that the angular extent of the spray is varied in order that for example a narrow jet of spray can be directed to a single weed. When one of these spray nozzles passes over a weed that has been identified as one that should be controlled by that particular chemical spray the processor 30 activates the specific nozzle that sprays chemical at the specific location of the weed that is required to be controlled by a that chemical spray. In FIG. 6 there are two specific locations of such a weed, one to be found between the track and one to the left of the tracks, and accordingly two spray nozzles have been activated. It is to be noted that weeds can pass under this truck that have already had one of the other chemicals applied by the spray based weed control technology 120*b-e* applied to them.

Figure 7:
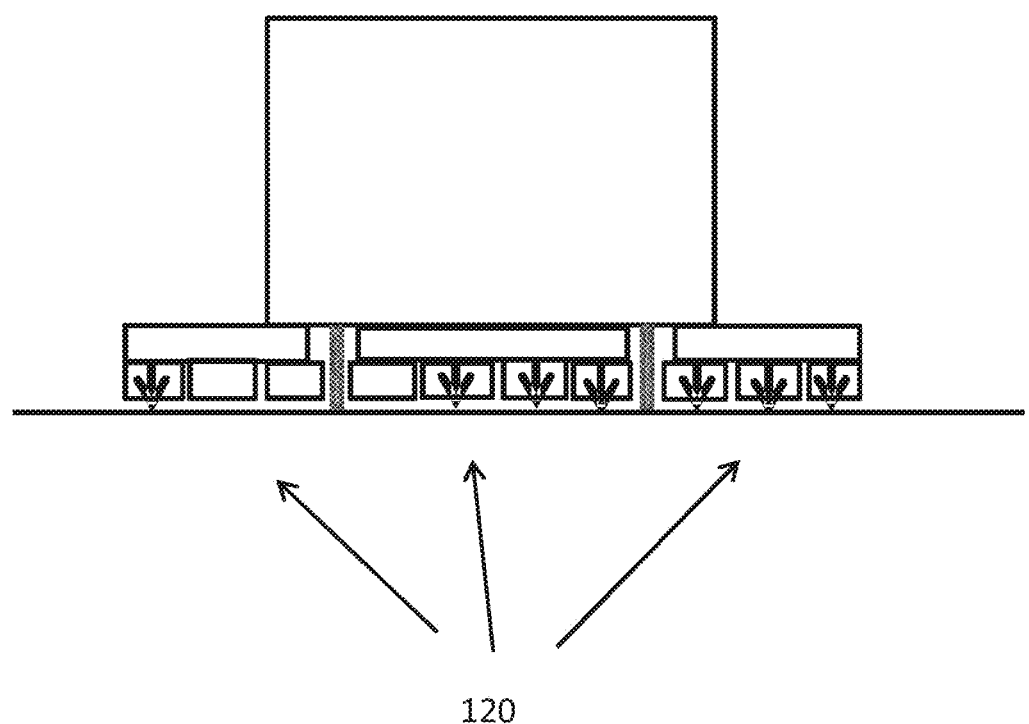
FIG. 7 shows an exemplary rear view schematic of a part of a system for weed control according to some embodiments.

FIG. 7 shows a truck of a weed control train 130 as shown in FIGS. 4-5, that has a high voltage based weed control technology 120*a-e* according to some embodiments. FIG. 7 shows a rear view of this truck of the train, with the view being that down the railway track. The different modes of the high voltage based weed control technology 120*a*, 120*b*, 120*c*, 120*d*, and 120*e* relate to different powers of high voltage that can be applied, and/or several units for example 120*a-b* can operate at the same power in order that that power can be applied for an extended duration. Simple experiments can be performed for different weeds to determine the different voltages and power levels and duration of application required in order to kill different weed types, enabling a database to be constructed from which the mode of operation of the high voltage technology can be selected. Similar databases can be constructed for different weed control technologies from which the required mode of operation for a specific weed can be determined. Thus different powers of high voltage and/or different durations of high voltage can be used to target specific types of vegetation types, with previous experimental work determining what mode of operation of high voltage power/duration is optimal for different types of weeds. A number of separate electrode pairs of the weed control technology extend laterally beneath the train and to the sides of the train, with these shown in greater detail in FIG. 9. The electrodes can also extend in a forward direction. When one of these electrode pairs passes over a weed that has been identified as one that should be controlled by that high voltage based weed control the processor 30 activates the specific pair or pairs of electrodes at the specific location of the weed that is required to be controlled by that high voltage and power. In FIG. 7 there are two specific locations of such a weed, one a large clump to be found between the track that also extends to the right hand side of the track and a small clump to be found to the left of the tracks, and accordingly one electrode pair has been activated at the left hand side and a number activated beneath the train extending to the right hand side. It is to be noted that if the specific unit shown is 120*b*, then weeds can pass under this truck can have already had one of the other modes of the high voltage weed control technology 120*c-e* applied to them, and weeds can pass under the truck in an untreated state if it has been determined that they should be addressed by the high voltage mode of the weed control technology of unit 120*a*.

Figure 8:
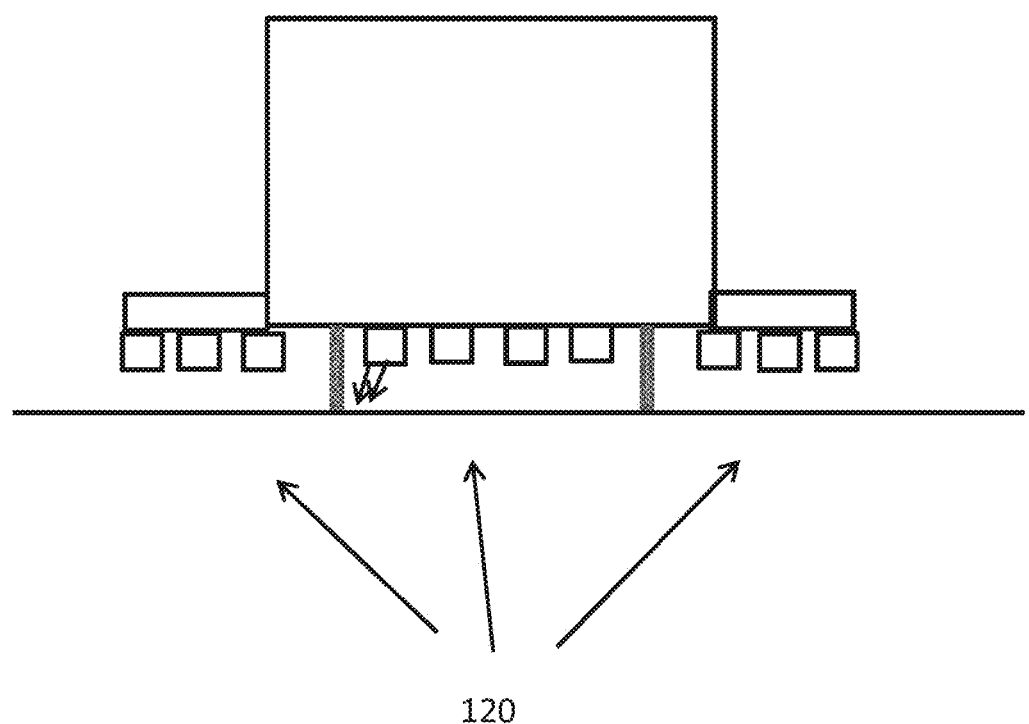
FIG. 8 shows an exemplary rear view schematic of a part of a system for weed control according to some embodiments.

FIG. 8 shows a truck of a weed control train 130 as shown in FIGS. 4-5, that has a laser based weed control technology 120*a-e* according to some embodiments. FIG. 8 shows a rear view of this truck of the train, with the view being that down the railway track. The different modes of the laser based weed control technology 120*a*, 120*b*, 120*c*, 120*d*, and 120*e* relate to different powers of laser radiation that can be applied, and/or several units for example 120*a-b* can operate at the same power in order that that power can be applied for an extended duration. Thus different powers of laser radiation and/or different durations of laser radiation can be used to target specific types of vegetation types, with previous experimental work determining what mode of operation of high voltage power/duration is optimal for different types of weeds. Different units can also operate at different wavelengths of laser radiation, with specific wavelengths having been determined experimentally to be optimum for weed control for specific types of weeds.

According to some embodiments, a number of separate laser systems of the weed control technology 120*c* extend laterally beneath the train and to the sides of the train, and can extend in a forward direction. Each laser system can simply operate in an on/off state illuminating the area under the laser system or can also be directionally steered as required in order that only the specific location of the weed is illuminated. When one of these laser systems passes over a weed that has been identified as one that should be controlled by that specific laser radiation based weed control the processor 30 activates the specific laser systems at the specific location of the weed that is required to be controlled by laser radiation. In FIG. 8 there is only one specific location of such a weed, that is located near to the left hand side track just between the tracks, and accordingly one laser system has been activated beneath the train with the laser radiation directed towards the specific location of the weed. According to some embodiments, the laser systems can be laser diode based, Nd:YAG based, Excimer based or any other laser system that has been indicated as being suitable for weed control. The specific truck shown has unit 120*c* that operates in a specific mode of laser radiation. It is to be noted that weeds can pass under this truck that have already had one of the other modes of laser based weed control technology 120*d-e* applied to them, and weeds can pass under the truck in an untreated state if it has been determined that they should be addressed by the mode of laser based weed control housed in one or more of units 120*a-b*.

Figure 9:
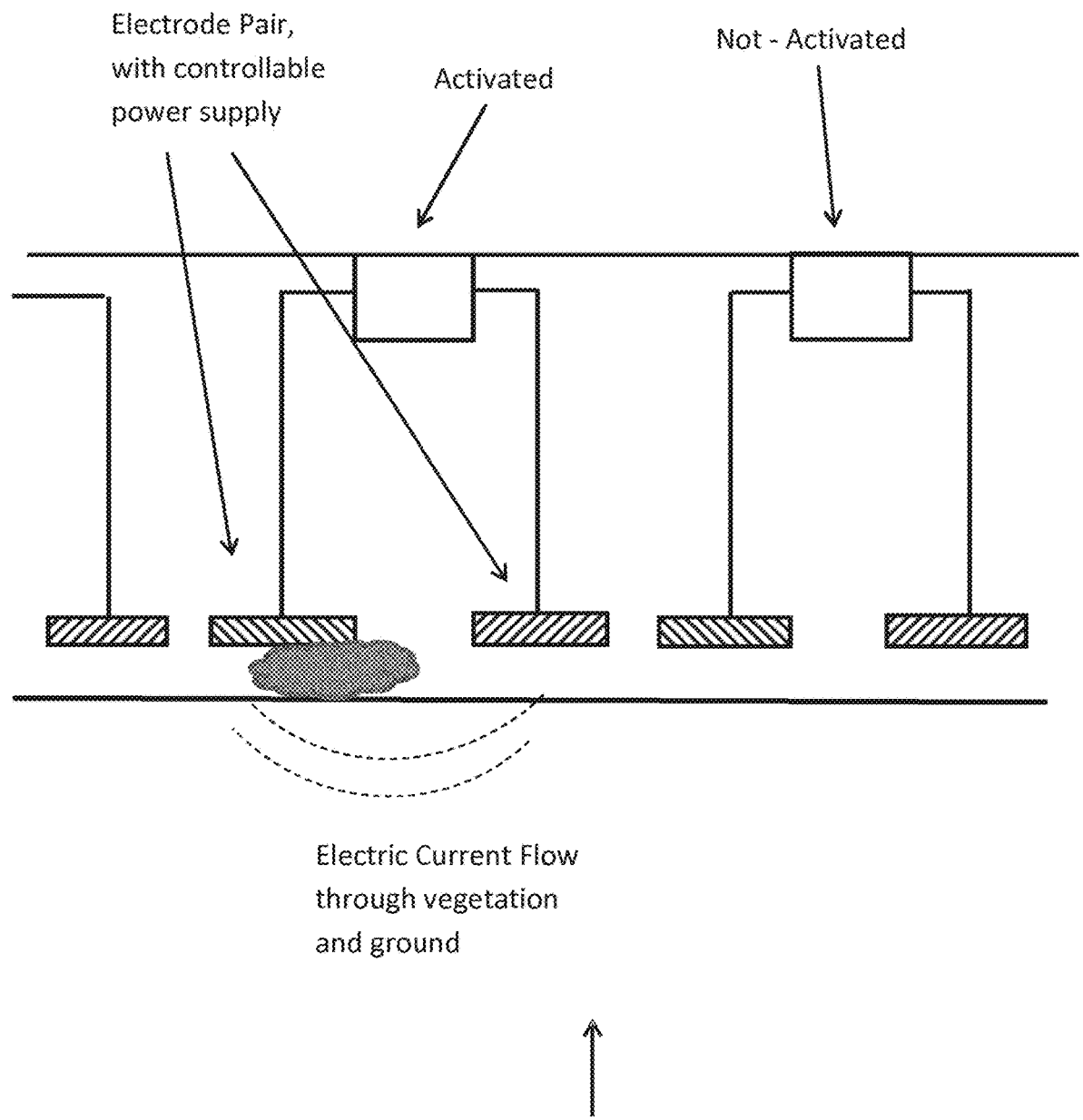
FIG. 9 shows a schematic set up of more detail of a section of the part of the system for weed control shown in FIG. 7.

FIG. 9 shows more detail of the high voltage based weed control technology according to some embodiments. Pairs of electrodes are provided, which when activated cause electric current to flow from one electrode to the other via the weed and the ground including the weed's root. One sub-unit shown can have one electrode pair or indeed have a number of electrode pairs in order to provide for greater resolution and a smaller spatial extent of the application of such high voltage based weed control. The high voltage can be applied in a DC mode for a period of time or in an AC mode for a period of time.

Figure 10:
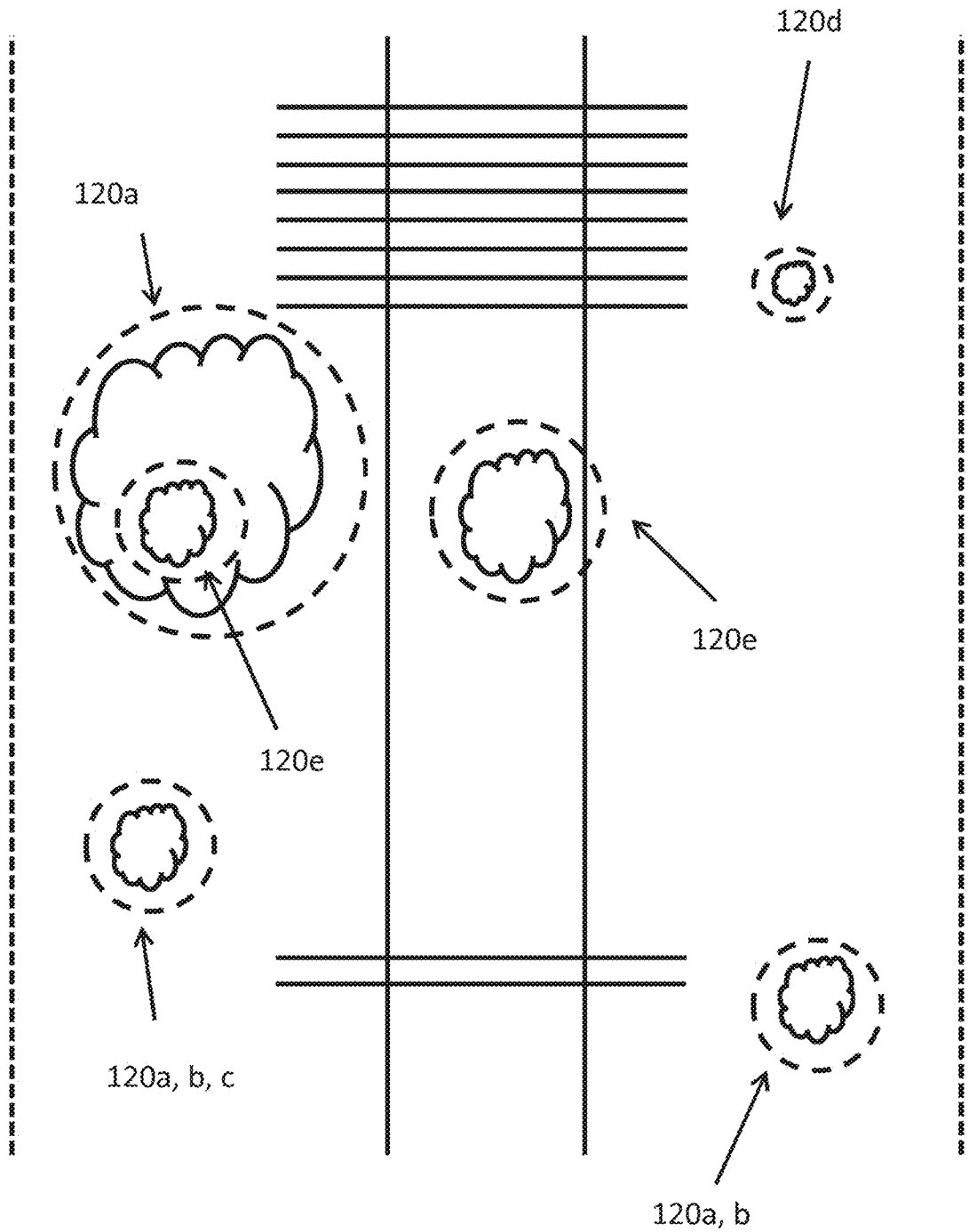
FIG. 10 shows a schematic representation of a railway track and surrounding area.

FIG. 10 shows a representation of a railway environment, showing the railway tracks and the ground to the side of the tracks according to some embodiments. A number of weed areas are shown, with a large clump of one type of weed having a clump of a different type of weed within it. Shown in FIG. 10 are the specific modes of weed control technology that have been determined to be activated for these specific weeds. As discussed above, units 120*a*, 120*b* and 120*c* operate at a power level of "AA", unit 120*d* operates at a power level of "10×AA" and unit 120*e* operates at a power level of "100×AA". These modes of operation are only representative examples, and different modes of operation are possible. Thus, according to some embodiments, it is determined that one weed clump, of a particular type of weed, should have a power level AA applied for an extended duration, and accordingly units 120a, 120b and 120c will activate at the location of the weed clump. Another weed clump, with a different type of weed, can be controlled with the same power level but it need not be applied for such an extended duration, and accordingly only units 120a and 120b will activate at the location of the weed. A large clump of easily controlled weeds can be controlled via a single application of power level AA, but within that clump image processing has determined that there is located a hard to kill weed and accordingly at that location of the hard to kill weed a power level of 100AA is required. Therefore over the whole clump, which may or may not include the hard to kill weed, unit 120a activates and at the specific location of the hard to kill weed unit 120e activates. This determination of what mode of operation of the weed control technology to be applied, be it duration, and/or power, or chemical or wavelength etc. can be considered to be the weed control map discussed with respect to FIG. 4, or the real-time determination of what mode of weed control technology should be applied as discussed with respect to FIG. 5.

Figure 11:
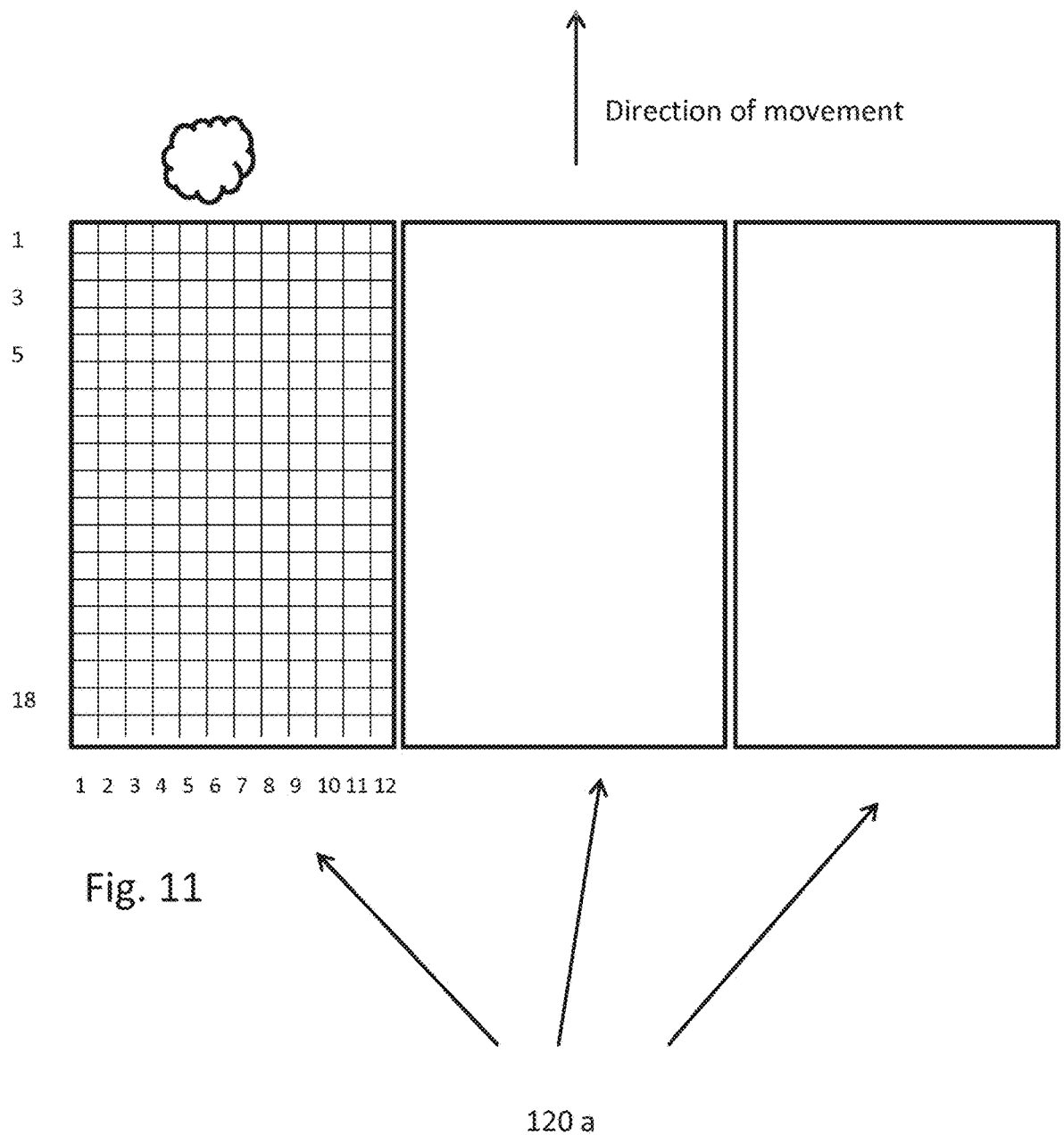
FIG. 11 shows an exemplary schematic of a part of a system for weed control according to some embodiments.

FIG. 11 shows more details of unit 120a for the high voltage weed control technology according to some embodiments. There is shown separate sub-units that are mounted to the truck of the train, with the centre unit beneath the train truck and the other sub-units to the side of the truck that can control weeds outsides of the tracks. In this specific example there are 19 rows of electrode pairs and 12 columns of electrode pairs. There can be various numbers of columns of electrode pairs and various row numbers, and there may only be one row. Unit 120a operates at a power level of AA. Referring to an electrode pair as a cell, at a coordinate system of row×column, then as the train moves forward cells 1×4, 1×5, 1×6 and 1×7 activate as these cells pass over the location of the weed. With further movement, in an example only these cells are active until these cells have passed over the weed. In this way a minimum duration of power AA can be applied. However, the cells can activate as the weed is located at different positions beneath the sub-unit. Thus, when the weed is first located under the front edge of the sub-unit cells 1×4-7, 2×4-7 and 3×4-7 are activated. As the train moves forward, 2×4-7, 3×4-7 and 4×4-7 are activated, then 3×4-7, 4×4-7 and 5×4-7 are activated. In this way, the weed progresses under the sub unit and at all positions the appropriate electrode pairs are activated until 17×4-7, 18×4-7 and 19×4-7 are activated, then 18×4-7 and 19×4-7 and finally 19×4-7 are activated. In this way a wave of activated electrode pairs activates at a fixed position, with the wave moving at the speed of the train. Different durations of power AA can be applied through activation of different number of electrode pairs, and if an increased duration of this power level is required then a following sub unit can activate electrodes at power AA as that unit passes over the weed. The other units operating at power 10AA and 100AA can operate in a similar manner. At one extreme however, then is only one row of electrodes, and these activate at the required positions, for example 1×4-7, as the unit passes over the weed. Other weed control technologies, such as the chemical spray, can similarly have rows and columns of activating spray nozzles for example under a unit. The same applies to microwave, flame based systems etc.

The above detailed examples have been discussed with respect to a railway, where different modes of a weed control technology (vegetation control technologies) are housed in different trucks of the train. According to some embodiments, these could be housed in a single truck, and there could be just two, three or four weed modes of a control technology, for example just two different chemical sprays or two units operating at different high voltage powers or a high voltage unit that operates at only one power level but can operate for more than one duration for a specific speed forward. Additionally, rather than a weed control train, a truck or lorry or Unimog can have a weed control technology mounted on/within it that can operate in more than one mode and, on the basis of previously acquired and processed imagery or on the basis of imagery it acquires and processes itself, drives around an industrial area or even an area such as an airport and apply specific modes of the weed control technology to specific weed types as discussed above.

In some exemplary embodiments, a computer program or computer program element is provided that is characterized by being configured to execute the method steps of the method according to one of the preceding embodiments, on an appropriate system. The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments. These exemplary embodiments of the invention cover both, a computer program that right from the beginning uses the invention and computer program that by means of an update turns an existing program into a program that uses invention.

According to some embodiments, the computer program element might be able to provide all necessary steps to fulfill the procedure of the exemplary embodiments of the method as described above. According to some embodiments, a computer readable medium, such as a CD-ROM, USB stick or the like, is presented wherein the computer readable medium has a computer program element stored on it which computer program element is described by the preceding section.

According to some embodiments, a computer program may be stored and/or distributed on a suitable medium, such as an optical storage medium or a solid state medium supplied together with or as part of other hardware, but may also be distributed in other forms, such as via the internet or other wired or wireless telecommunication systems.

However, according to some embodiments, the computer program may also be presented over a network like the World Wide Web and can be downloaded into the working memory of a data processor from such a network. According to some embodiments, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for weed control comprising a processor configured to:
   receive from an input at least one image of an environment;
   analyze the at least one image to determine a first type of weed in at least a first part of the environment;
   analyze the at least one image to determine a second type of weed in at least a second part of the environment;
   analyze the at least one image to determine a first mode of operation of a vegetation control technology from a plurality of modes of operation of the vegetation control technology to be used for weed control for the first type of weed in at least the first part of the environment;
   analyze the at least one image to determine a second mode of operation of the vegetation control technology from the plurality of modes of operation of the vegetation control technology to be used for weed control for the second type of weed in at least the second part of the environment; and
   output information for activating the vegetation control technology in at least the determined first mode of operation of vegetation control technology and the determined second mode of operation of vegetation control technology.

2. The apparatus of claim 1, wherein analysis of the at least one image to determine the first mode of operation of vegetation control technology comprises a determination of at least one location of vegetation in the at least first part of the environment, and wherein the processor is configured to determine the first mode of operation of vegetation control technology to be used at the at least one location.

3. The apparatus of claim 1, wherein the at least one image was acquired by at least one camera, and wherein the processor is configured to receive from the input at least one location associated with the at least one camera when the at least one image was acquired.

4. The apparatus of claim 1, wherein the processor is configured to determine at least one location of the first type of weed or at least one location of the second type of weed.

5. A system for weed control, comprising:
   at least one camera configured to acquire at least one image of an environment;
   a vegetation control technology mounted on a vehicle, wherein the vegetation control technology is configured to operate in a plurality of modes of operation; and
   an apparatus comprising a processor configured to:
      receive from the at least one camera the at least one image of the environment,
      analyze the at least one image to determine a first type of weed in at least a first part of the environment,
      analyze the at least one image to determine a second type of weed in at least a second part of the environment,
      analyze the at least one image to determine a first mode of operation of the vegetation control technology from the plurality of modes of operation of the vegetation control technology to be used for weed control for the first type of weed in at least the first part of the environment,
      analyze the at least one image to determine a second mode of operation of the vegetation control technology from the plurality of modes of operation of the vegetation control technology to be used for weed control for the second type of weed in at least the second part of the environment, and
      output information to activate the vegetation control technology in the determined first mode of operation of the vegetation control technology in the at least first part of the environment and the determined second mode of operation of the vegetation control technology in at least the second part of the environment.

6. The system of claim 5, wherein the apparatus is mounted on the vehicle; and wherein the at least one camera is mounted on the vehicle.

7. The system of claim 5, wherein the vegetation control technology comprises a plurality of units, and wherein the plurality of units are configured to operate in the plurality of modes of operation.

8. A method for weed control, comprising:
   receiving by a processor at least one image of an environment;
   analyzing by the processor the at least one image to determine a first type of weed in at least a first part of the environment,
   analyzing by the processor the at least one image to determine a second type of weed in at least a second part of the environment,
   analyzing by the processor the at least one image to determine a first mode of operation of a vegetation control technology from a plurality of modes of operation of the vegetation control technology to be used for weed control for the first type of weed in at least a first part of the environment;
   analyzing by the processor the at least one image to determine a second mode of operation of a vegetation control technology from the plurality of modes of operation of the vegetation control technology to be used for weed control for the second type of weed in at least the second part of the environment; and
   outputting information by the processor to activate the vegetation control technology in at least the determined first mode of operation of the vegetation control technology and the determined second mode of operation of the vegetation control technology.

9. The method of claim 8, further comprising analyzing the at least one image to determine at least one location of vegetation in the at least first part of the environment; and determining by the processor the first mode of operation of the vegetation control technology to be used at the at least one location.

10. The method of claim 8, wherein the at least one image was acquired by at least one camera; and wherein the method comprises receiving by the processor at least one location associated with the at least one camera when the at least one image was acquired.

11. A non-transitory computer readable storage medium comprising instructions that, when executed by a processor, cause the processor to:
receive from an input at least one image of an environment;
analyze the at least one image to determine a first type of weed in at least a first part of the environment,
analyze the at least one image to determine a second type of weed in at least a second part of the environment,
analyze the at least one image to determine a first mode of operation of a vegetation control technology from a plurality of modes of operation of the vegetation control technology to be used for weed control for the first type of weed in at least a first part of the environment;
analyze the at least one image to determine a second mode of operation of the vegetation control technology from the plurality of modes of operation of the vegetation control technology to be used for weed control for the second type of weed in at least the second part of the environment; and
output information to activate the vegetation control technology in at least the determined first mode of operation of the vegetation control technology and the determined second mode of operation of the vegetation control technology.

* * * * *